United States Patent [19]

Kim

[11] Patent Number: 5,768,246

[45] Date of Patent: Jun. 16, 1998

[54] METHOD AND APPARATUS FOR RECORDING AND REPRODUCING DIGITAL DATA USING FREQUENCY DOMAIN CONVERSION AND DETECTION

[75] Inventor: Ki-ho Kim, Kwacheon, Rep. of Korea

[73] Assignee: Samsung Electronics Co., Ltd., Kyungki-do, Rep. of Korea

[21] Appl. No.: 790,415

[22] Filed: Jan. 30, 1997

Related U.S. Application Data

[63] Continuation-in-part of Ser. No. 365,907, Dec. 29, 1994, abandoned.

[30] Foreign Application Priority Data

Aug. 30, 1994 [KR] Rep. of Korea .............. 94-21561

[51] Int. Cl.⁶ .................................................. G11B 7/00
[52] U.S. Cl. ........................................ 369/124; 369/47
[58] Field of Search ............................ 369/51, 69, 124, 369/47, 48, 54, 86, 59, 58; 360/32, 46, 53, 48, 51; 395/2.91

[56] References Cited

U.S. PATENT DOCUMENTS 4,989,219  1/1991  Gerdes et al. .................... 375/286
5,233,482  8/1993  Galbraith et al. ................. 360/46
5,291,469  3/1994  Yoshinaka ........................ 369/69
5,406,428  4/1995  Suzuki ............................. 360/53
5,654,952  8/1997  Suzuki et al. .................... 369/124

*Primary Examiner*—Ali Neyzari
*Attorney, Agent, or Firm*—Leydig, Voit & Mayer, Ltd.

[57] ABSTRACT

A digital data recording/reproducing apparatus and method using frequency domain detection. The reproducer of the apparatus includes an analog-to-digital converter for converting the read-out signal from the storage means into digital data; a second serial-to-parallel converter for converting the digital data into a block of digital data; a frequency domain converter for converting the block of digital data into a block of frequency domain signals; and a detector for detecting bits of serial binary data from the block of frequency domain signals. The detector comprises a calculating means for calculating Euclidian norms between the block of frequency domain signals and plurality of reference data blocks, respectively, and determining a binary data set which corresponds to the minimum value of the Euclidian norms. Alternatively, the detector comprises a comparing means for sequentially comparing the block of frequency domain signals with a plurality of thresholds to determine the bits of serial binary data. Thus, non-linearity is avoided, and thus high density recording and lower clock frequencies are achieved.

24 Claims, 8 Drawing Sheets

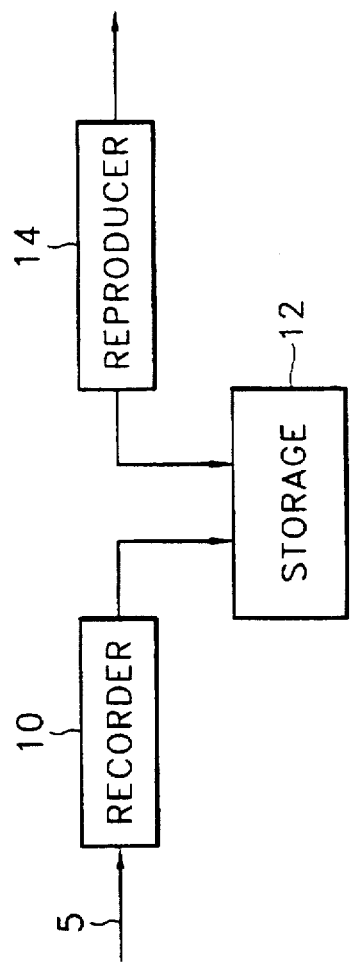
FIG. 1 (PRIOR ART)
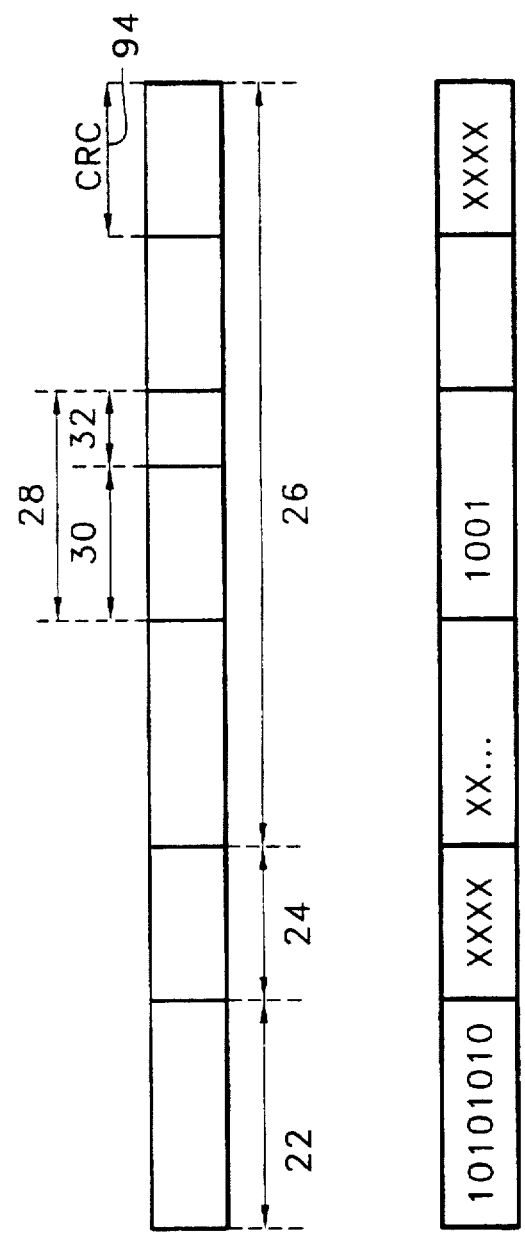
FIG. 2A
FIG. 2B

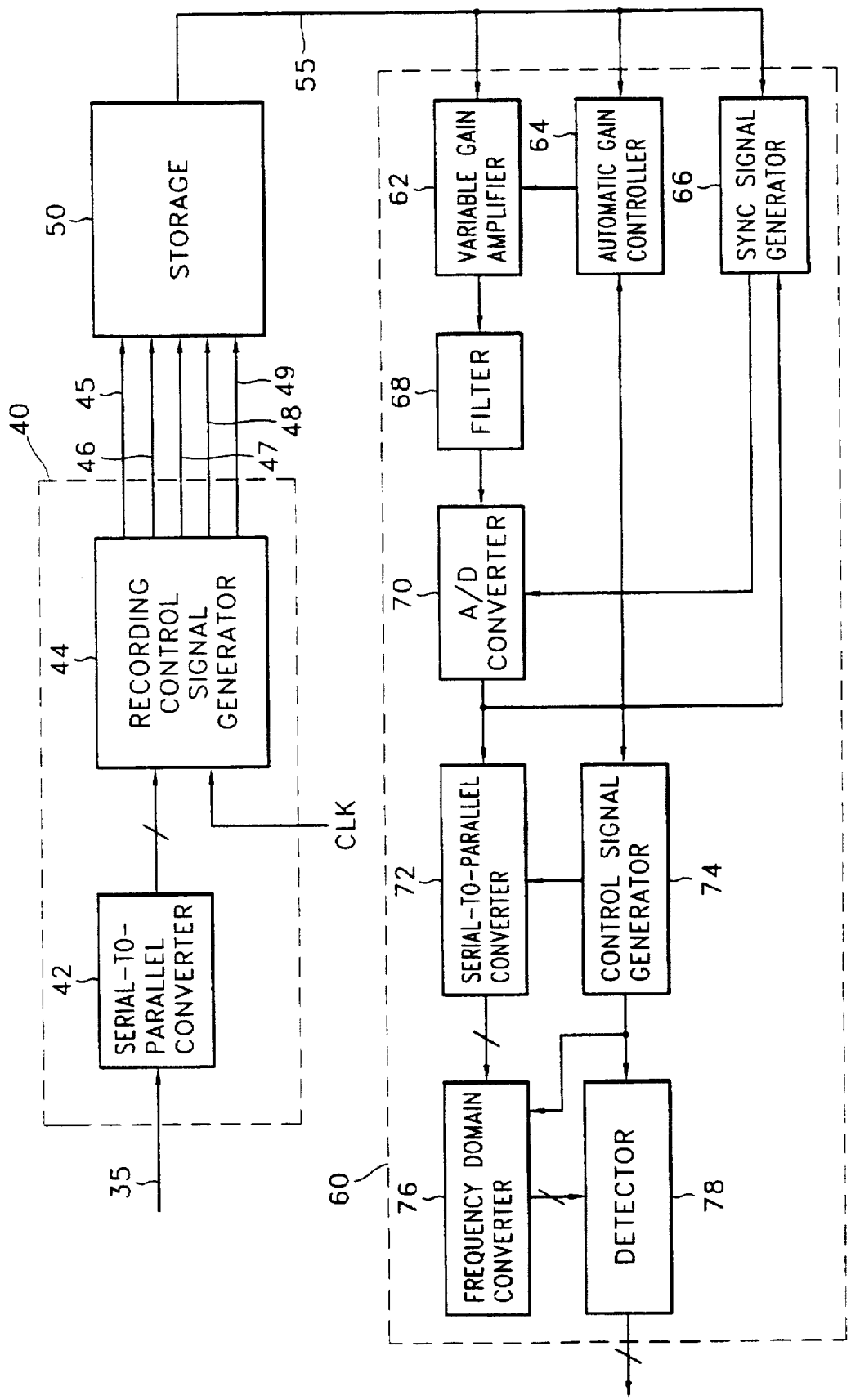

FIG.5

| BIT PATTERN | x(0) | \|x(fs)\| | \|x(2fs)\| | \|x(3fs)\| | ∡x(0) | ∡x(fs) | ∡x(2fs) | ∡x(3fs) |
|---|---|---|---|---|---|---|---|---|
| 0000 | 0 | 0 | 0 | 0 | 0 | 0 | 0 | 0 |
| 0001 | 2.2523 | 0.8074 | 0.4677 | 0.8074 | 0 | 2.2265 | 3.1416 | −2.2265 |
| 0010 | 2.7446 | 0.6400 | 0.0246 | 0.6400 | 0 | −3.1416 | 3.1416 | 3.1416 |
| 0011 | 4.9969 | 1.3007 | 0.4923 | 1.3007 | 0 | 2.6271 | 3.1416 | −2.6271 |
| 0100 | 2.7446 | 0.6400 | 0.0246 | 0.6400 | 0 | −1.5708 | 0 | 1.5708 |
| 0101 | 4.9969 | 0.4923 | 0.4431 | 0.4923 | 0 | −3.1416 | 3.1416 | 3.1416 |
| 0110 | 5.4892 | 0.9051 | 0 | 0.9051 | 0 | −2.3562 | 0 | 2.3562 |
| 0111 | 7.7415 | 1.1323 | 0.4677 | 1.1323 | 0 | −3.1416 | 3.1416 | 3.1416 |
| 1000 | 2.2523 | 0.8407 | 0.4677 | 0.8074 | 0 | −0.6557 | 0 | 0.6557 |
| 1001 | 4.5046 | 0.2089 | 0 | 0.2089 | 0 | 0.7854 | 0 | −0.7854 |
| 1010 | 4.9969 | 0.4923 | 0.4431 | 0.4923 | 0 | −1.5708 | 0 | 1.5708 |
| 1011 | 7.2492 | 0.5140 | 0.0246 | 0.5140 | 0 | 2.8501 | 3.1416 | −2.8501 |
| 1100 | 4.9969 | 1.3007 | 0.4923 | 1.3007 | 0 | −1.0563 | 0 | 1.0563 |
| 1101 | 7.2492 | 0.5140 | 0.0246 | 0.5140 | 0 | −1.2793 | 0 | 1.2793 |
| 1110 | 7.7415 | 1.1323 | 0.4677 | 1.1323 | 0 | −1.5708 | 0 | 1.5708 |
| 1111 | 9.9938 | 0.6962 | 0 | 0.6962 | 0 | −2.3562 | 0 | 2.3563 |

METHOD AND APPARATUS FOR RECORDING AND REPRODUCING DIGITAL DATA USING FREQUENCY DOMAIN CONVERSION AND DETECTION

RELATED APPLICATIONS

The present application is a continuation-in-part application of the U.S. patent application Ser No. 08/365,907, filed Dec. 29, 1994.

FIELD OF THE INVENTION

The present invention relates to a digital recording/reproducing apparatus and method thereof, and more particularly, to a digital recording/reproducing apparatus using a frequency domain detection.

BACKGROUD OF THE INVENTION

In general, digital recording/reproducing apparatus adopts recording/reproducing concepts of spatial domain in which the reproduced signal is represented as a time domain signal. FIG. 1 schematically illustrates a conventional digital data recording/reproducing apparatus. Digital binary data input via a terminal 5 is stored by a recorder 10 in a storage 12 as bit unit by spatially separated recordings by employing a magnetic recording or magneto-optical recording system. The bit units are reproduced by a reproducer 14 by reading the spatially separated recordings. The recorder 10 has to maintain a predetermined space between each recording by using a run-length limited (RLL) code so that a channel characteristic can be linear. A nonlinear distortion is estimated in advance and is usually removed during a recording process by a precompensator. A reproducer 14 detects the recorded binary data based on an analog detection method (for example, peak detector) in which a signal characteristic of a recorded bit (for example, peak or amplitude) is examined or a digital detection method (for example, Partial Response Maximum Likelihood (PRML) or Decision Feedback Equlization (DFE)) in which an inter-symbol interference between the recorded bits is removed or controlled via an equalizer.

As the record density of a conventional digital data recording/reproducing apparatus becomes high, channel nonlinearity degrades the performance of the apparatus. The use of a code for removing the nonlinear distortion (for example, RLL (1,7) code), however, increases the channel bit rate and the hardware complexity due to the increased (sampling) clock rate. Similarly, advanced digital detection methods using a nonlinear equalizer to remove nonlinear distortion requires quite complex hardware and expensive digital memories.

SUMMARY OF THE INVENTION

Accordingly, it is an object of the present invention to provide a digital recording/reproducing apparatus using frequency domain detection.

It is another object of the present invention to provide a digital recording/reproducing method using frequency domain detection.

To accomplish the above object, there is provided a digital data recording/reproducing apparatus using frequency domain detection comprising: a first serial-to-parallel converter for converting bits of serial binary data set into a plurality of parallel binary data set; a recording control signal generator for generating a recording control signal set to store the plurality of parallel binary data set; means for storing the modulated binary pulses in response to the recording control signal set; means for reading out the stored data; an analog-to-digital converter for converting the read-out signal from the storage means into digital data; a second serial-to-parallel converter for converting the digital data into a block of digital data; a frequency domain converter for converting the block of digital data into a block of frequency domain signals; and a detector for detecting bits of serial binary data from the block of frequency domain signals.

To accomplish another object of the present invention, there is provided a digital data recording/reproducing method comprising the steps of: (a) first serial-to-parallel converting bits of serial binary data set into a parallel binary data set; (b) generating a recording control signal set to store the plurality of parallel binary data set; (c) reading out the stored data; (d) analog-to-digital converting the reproduced data into a digital signal; (e) second serial-to-parallel converting the digital signal into a block of digital signals; (f) converting the block of digital data into a block of frequency domain signals; and (g) detecting the serial binary data from the block of frequency domain signals.

BRIEF DESCRIPTION OF DRAWINGS

The above objects and other advantages of the present invention will become more apparent by describing in detail a preferred embodiment thereof with reference to the attached drawings in which:

FIG. 1 is a block diagram showing a conventional digital data recording/reproducing apparatus;

FIG. 2A illustrates a basic format of data which is recorded and reproduced in the present invention.

FIG. 2B illustrates an example of the basic data format shown in FIG. 2A.

FIG. 3 is a block diagram of an embodiment of a digital data recording/reproducing apparatus of the present invention;

FIG. 5 shows an example of the frequency domain values of the first through the sixteenth reference data blocks shown in FIG. 4.

DETAILED DESCRIPTION OF THE INVENTION

Figure 4:
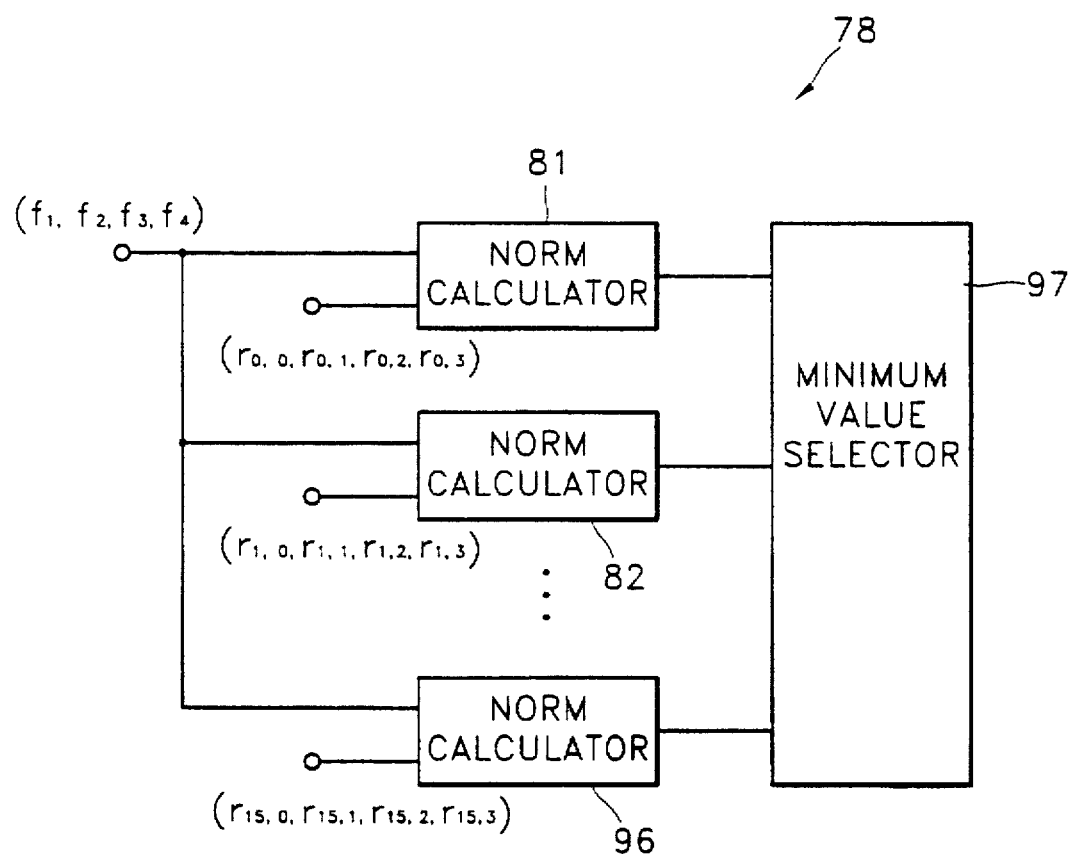
FIG. 4 illustrates a detector 78 according to an embodiment of the present invention.

The present invention will be explained in more detail with reference to the attached drawings.

FIG. 2A illustrates a basic format of data which is recorded and reproduced in the present invention and FIG. 2B illustrates an example of the basic data format shown in FIG. 2A. The basic data format shown in FIG. 2A consists of a bit synchronization 22, a block synchronization 24, and a recording data block 26, thereby forming a bit pattern having a predetermined size. The predetermined size of the basic data format varies depending on the characteristics of the specific recording medium and the complexity of the reproducing hardware.

The bit synchronization 22 indicates the beginning of the data format and is used to recover a sampling clock when the recorded data is reproduced. Any bit pattern which contains a strong frequency component at the sampling frequency or its harmonics is allowed for the bit synchronization. In the example of FIG. 2B, the bit synchronization pattern has a pattern of "10101010".

The block synchronization 24 separates the recording data blocks correctly in order to enable the blockwise processing of data. The block synchronization 24 is made up of a specific bit pattern which is uncorrelated as possible with the recording data blocks and the bit pattern of the bit synchronization 22 so that an erroneous detection is negligible.

The recording data block 26 consists of a number of data blocks 28 and a CRC code 34 for detecting errors in the recording data block. A data block 28 consists of data bits 30 for recording retrieved information and transition bits 32 for isolating the interference between adjacent data bits 30. The size (number) of data bits 30 corresponds to the size of a transform (e.g., FFT or wavelet transform) performed by the frequency domain converter 76, described below, is typically a power of 2. The transition bits 32 are a predetermined bit pattern for isolating the interference between adjacent data bits 30. Preferably, the transition bits are made up of as few bits as possible in order to reduce the redundancy. In the example of FIG. 2B, each of the data block 28 has four data bits and zero transition bits.

FIG. 3 is a block diagram of an embodiment of a digital recording/reproducing apparatus using frequency domain detection of the present invention.

Specifically, the digital recording/reproducing apparatus of the present invention comprises a recorder 40, a storage 50 and a reproducer 60. The recorder 40 converts serial binary data which is input via the terminal 35 into a parallel binary data set, and records the parallel binary data set in the storage 50. The storage 50 is a magneto-optical or a magnetic recording medium. The reproducer 60 reads out the record data in the storage 50 to retrieve the original information.

The recorder 40 includes a serial-to-parallel converter 42 and a recording control signal generator 44.

The serial-to-parallel converter 42 latches a serial binary digital data which is input via a terminal 35 in units of a data block size and converts the latched serial binary data into parallel binary data set.

The recording control signal generator 44 inputs the parallel binary data set and modulates the parallel binary data set. Afterwards, the generator 44 generates a recording control signal set to record modulated binary pulses corresponding to the parallel binary data set in synchronicity with a recording clock CLK.

The recording control signal set includes magneto-optical recording control signals 45, 46, and 47 in case of magneto-optical recording or magnetic recording control signals 48 and 49 in case of magnetic recording.

The control signal 45 controls the power of the recording laser diode in order to reduce the effect (e.g., bloom) due to the overheating of media surface during recording. The edge shift signal 46 is a control signal for leading or lagging of the rising/falling edge which indicates the start and the end of a recording. The modulation signal 47 controls on/off state of a laser diode to control the surface temperature together with the control signal 45.

The magnetic recording control signal 48 controls the amount of magnetic flux and the edge shift signal 49 controls the leading/lagging time for changing the direction of the magnetic flux.

The storage 50 is a magnetic or a magneto-optical recording medium. The recording control signals described above can have other roles and/or functions if another medium such as "phase change" is used as the storage medium.

The reproducer 60 includes a variable gain amplifier 62, an automatic gain controller 64, a sync signal generator 66, a filter 68, an analog-to-digital (A/D) converter 70, a serial-to-parallel converter 72, a control signal generator 74, a frequency domain converter 76, and a detector 78.

The data recorded in storage 50 is read out via a photo-diode in case of the magneto-optical recording or a reproducing head (e.g., thin film head, MR head, or MIG head) in case of the magnetic recording. Then, the reproduced signal is applied as an analog signal to the variable gain amplifier 62 and the automatic gain controller 64 and sync signal generator 66 via a terminal 55.

The variable gain amplifier 62 inputs the reproduced signal and compensates for a gain fluctuation of the analog signal from a photo-diode or a reproducing head in response to a gain control signal from the automatic gain controller 64.

The automatic gain controller 64 inputs the digital data from the A/D converter 70 and/or the analog signal input via the terminal 55, detects the gain fluctuation of the reproduced signal, and generates an automatic gain control (AGC) signal to output such signal to the variable gain amplifier 62.

The sync signal generator 66 receives a digital data output by the A/D converter 70, detects the bit synchronization 22 of the data format shown in FIG. 2A, e.g., "10101010" in FIG. 2B by the use of a digital phase locked loop (PLL), and recovers a sampling clock to output such clock to the A/D converter. Alternatively, the sync signal generator 66 receives the analog signal from the terminal 55 and recovers a sampling clock by the use of a threshold detector and an analog phase locked loop.

The filter 68 inputs the gain controlled signal from the variable gain amplifier 62 and carries out lowpass filtering in order to eliminate the noise in the stopband so that an aliasing is avoided.

The A/D converter 70 inputs the filtered signal output by the filter 68 and samples the signal using a sampling clock output by the sync signal generator 66.

The serial-to-parallel converter 72 inputs the digital data output by the A/D converter 70 and converts the data into a block of digital data in response to control signals output by the control signal generator 74.

The control signal generator 74 inputs the digital data output by the AID converter 70 and generates control signals including a bit synchronization and a block synchronization.

The frequency domain converter 76 inputs the block of digital data output by the serial-to-parallel converter 72 and converts such signal into a block of frequency domain signals. As such a transform method to a frequency domain, a discrete Fourier transform (or fast Fourier transform) or a wavelet transform is employed.

The detector 78 determines a most likely bit pattern (or most likely binary data set) based on the amplitudes and phases of the frequency domain signals.

FIG. 4 illustrates the detector 78 shown in FIG. 3. Specifically, the detector 78 includes sixteen norm calculators 81 through 96 and a minimum value selector 97.

The norm calculator 81 inputs the block of frequency domain signals ($f_1$, $f_2$, $f_3$, $f_4$) which is output by the frequency domain converter 76 and calculates the Euclidian norm between the block of frequency domain signals and a first reference data block ($r_{0,0}$, $r_{0,1}$, $r_{0,2}$, $r_{0,3}$) by using the following equation:

$$N(f,r^{(0)}) = \sum_{k=1}^{4} (f_k - r_{0,k})^2$$

Similarly, the norm calculators 82 through 96 inputs the block of frequency domain signals ($f_1$, $f_2$, $f_3$, $f_4$) which is output by the frequency domain converter 76 and calculates the Euclidian norms between the block of frequency domain signals and m-th reference data block ($r_{m,0}$, $r_{m,1}$, $r_{m,2}$, $r_{m,3}$) by using the following equation:

$$N(f,r^{(m)}) = \sum_{k=1}^{4} (f_k - r_{m,k})^2,$$

where m=1, 3, ...., 15.

In the calculations above, $f_1$, $f_2$, $f_3$, and $f_4$ are DC, fs, 2fs, 3fs components of the block of frequency domain signals, respectively, where fs denotes the sampling frequency. Meanwhile, the first through the sixteenth reference data blocks are frequency domain values corresponding to (0,0, 0,0), (0,0,0,1), ...., (1,1,1,1), respectively. Alternatively, the first through the sixteenth reference data blocks are defined experimentally by recording respective data (0,0,0,0), (0,0, 0,1), ...., (1,1,1,1) in the storage 50 and reproducing such signals in frequency domains.

FIG. 5 shows an example of the frequency domain values of the first through the sixteenth reference data blocks, which are represented as two components, i.e., an amplitude component and an phase component. In FIG. 5, the frequency domain values of reference data blocks are those calculated by carrying out fast Fourier transform (FFT) of a time domain data block, e.g., (0,0,0,0) after sampling with the symbol rate and zero-padding before and after the time domain data block.

The norm calculators 81 through 96 output the respective norms $N(f,r^{(n)})$, where m=0,2, ...., 15.

The minimum value selector 97 inputs the Euclidian norms output by the norm calculators 81 through 96, selects the smallest norm, and outputs the time domain value of a reference data block which corresponds to the smallest norm as the binary data set.

The detector shown in FIG. 4 may be implemented using software instead of the combinational logic circuit.

In the another embodiment of the detector 78, the reproduced data are detected by sequentially comparing the block of frequency domain signals ($f_1$, $f_2$, $f_3$, $f_4$) with predetermined thresholds which are defined experimentally.

Figure 6A:
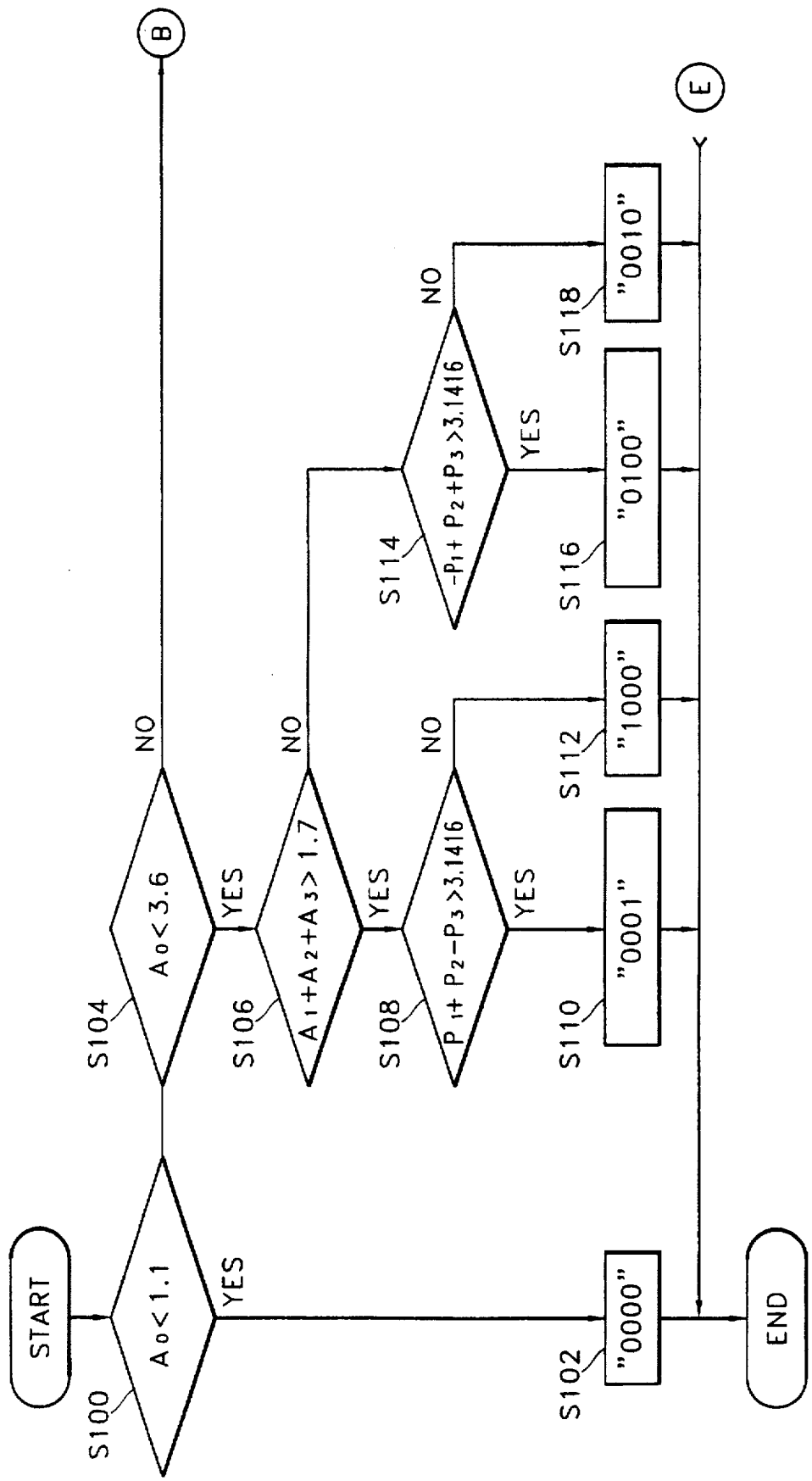
FIGS. 6A, 6B and 6C are flowcharts for showing a detecting method in a detector according to another embodiment of the present invention.
Figure 6B:
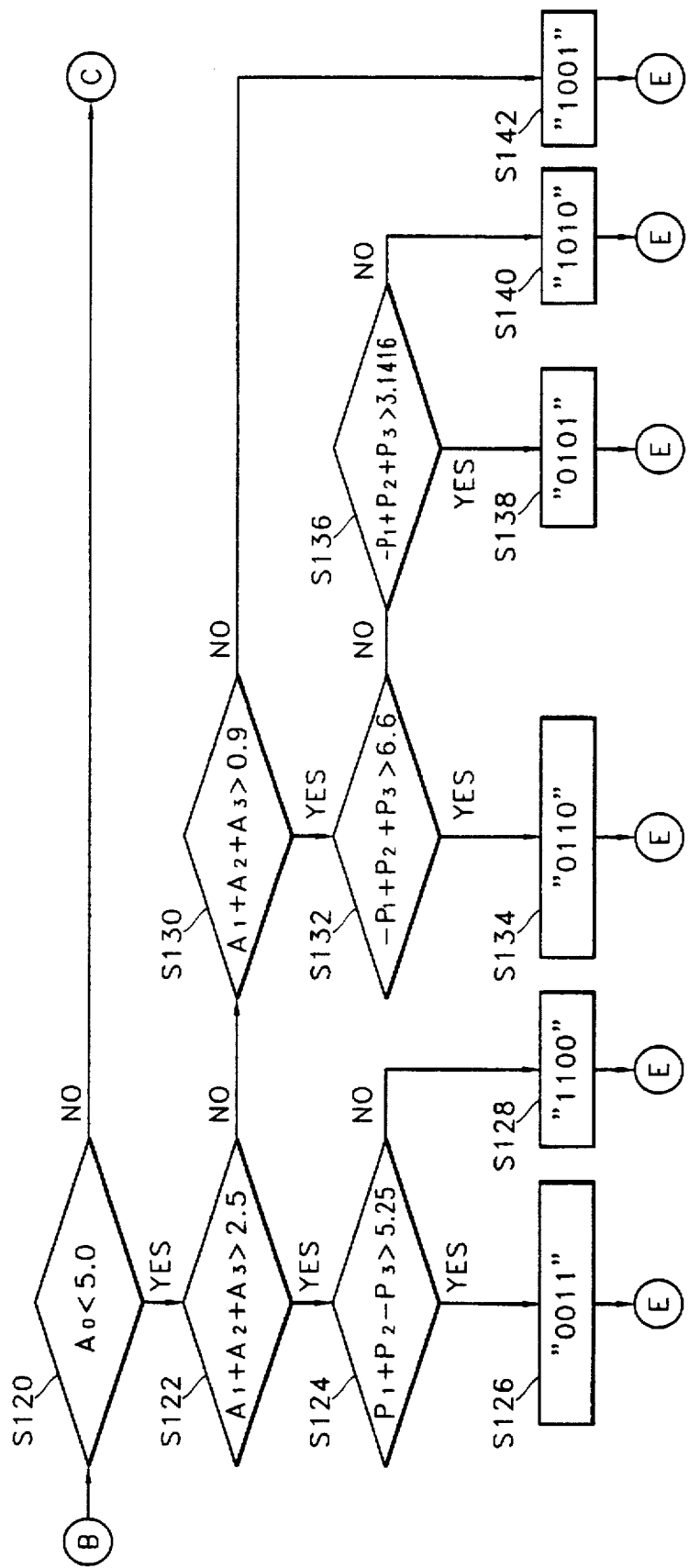
Figure 6C:
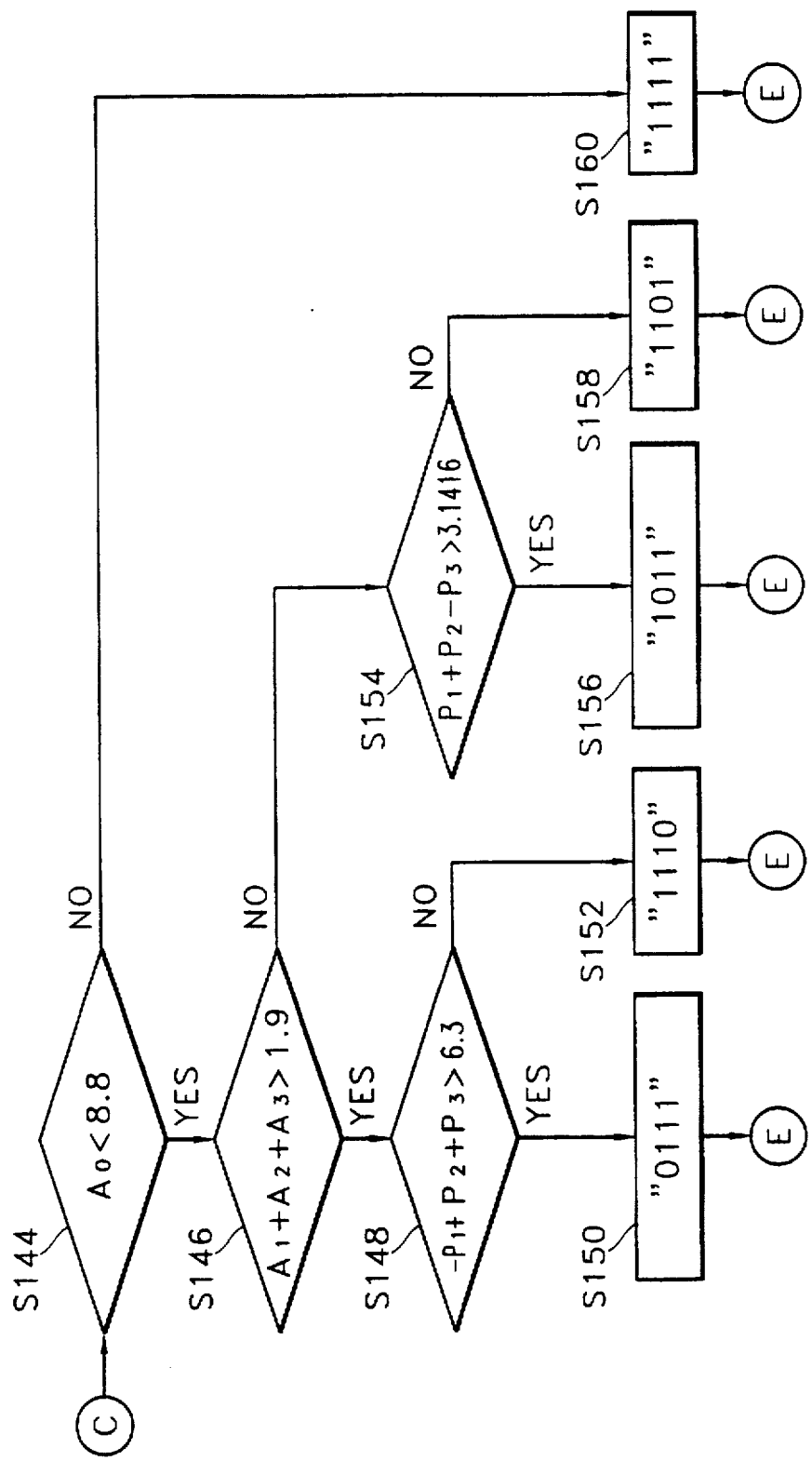

FIGS. 6A, 6B and 6C are flowcharts for explaining a detecting method in a detector 78 according to another embodiment of the present invention.

The detection method according to the another embodiment shown in FIG. 6 will be described below. In FIG. 6, the thresholds are set assuming the frequency domain signals have the same value as the reference data blocks shown in FIG. 6.

First, the bit patterns are categorized into 5 groups depending on the amplitude A, of DC component of the frequency domain signal: group 1 consisting of (0000); group 2 consisting of (0001), (0010), (0100) and (1000); group 3 consisting of (0011), (0101), (0110), (1001), (1010) and (1100); group 4 consisting of (0111), (1011), (1101) and (1110) ; and group 5 of (1111).

One of the bit pattern in a group is selected depending on the absolute amplitude $A_1$ of $f_s$ component ($f_1$) of the frequency domain signals, the absolute amplitude $A_2$ of $2f_s$ component ($f_2$), and the absolute amplitude $A_3$ of $3f_s$ component ($f_3$), the phase $P_1$ of $f_s$ component ($f_s$), the phase $P_2$ of $2f_s$ component ($f_2$), and the phase $P_3$ of $3f_s$ component ($f_3$).

Specifically, it is determined first whether the amplitude $A_0$ of the DC component of the frequency domain signal ($f_0$) is less than 1.1 (S100). If $A_0$ is less than 1.1, group 1, i.e., "0000" is output as the binary data set (S102).

When $A_0$ is not less than 1.1 in step 100, it is determined whether $A_0$ is less than 3.6 (S104). If $A_0$ is less than 3.6, it is determined whether the sum of the absolute amplitude $A_1$ of $f_s$ component ($f_1$) of the frequency domain signals, the absolute amplitude $A_2$ of $2f_s$ component ($f_2$), and the amplitude $A_3$ of $3f_s$ component ($f_3$), i.e., $A_1+A_2+A_3$, is greater than 1.7 (S106). It is further determined whether the sum of the phase $P_1$ of $f_s$ component ($f_1$) and the phase $P_2$ of $2f_s$ component ($f_2$) which is subtracted by the phase $P_3$ of $3f_s$ component ($f_3$), i.e., $P_1+P_2-P_3$, is greater than 3.1416 (S108). The binary data set "0001" is output when $A_1+A_2+A_3$ is greater than 1.7 and $P_1+P_2-P_3$ is greater than 3.1416 (S110), while "1000" is output as the binary data set when $A_1+A_2+A_3$ is greater than 1.7 but $P_1+P_2-P_3$ is not greater than 3.1416 (S112).

When $A_1+A_2+A_3$ is not greater than 1.7 in step 106, it is determined whether $-P_1+P_2+P_3$ is greater than 3.1416 (S114). The binary data set "0100" is output when $-P_1+P_2+P_3$ is greater than 3.1416 (S116), while "0010" is output as the binary data set when $-P_1+P_2+P_3$ is not greater than 3.1456 (S118).

When $A_0$ is not less than 3.6 in step 104, it is determined whether $A_0$ is less than 5.0 (S120). When $A_0$ is less than 5.0 in step 120, it is determined whether $A_1+A_2+A_3$ is greater than 2.5 (S122). If $A_1+A_2+A_3$ is greater than 2.5, it is further determined whether $P_1+P_2-P_3$ is greater than 5.25 (S124). The binary data set "0011" is output when $A_1+A_2+A_3$ is greater than 2.5 and $P_1+P_2-P_3$ is greater than 5.25 (S126), while "1100" is output as the binary data set when $A_1+A_2+A_3$ is greater than 2.5 but $P_1+P_2-P_3$ is not greater than 5.25 (S128).

When $A_1+A_2+A_3$ is not greater than 2.5 in step 122, it is determined whether $A_1+A_2+A_3$ is greater than 0.9 (S130). If $A_1+A_2+A_3$ is greater than 0.9, it is further determined whether $-P_1+P_2+P_3$ is greater than 6.6 (S132). When $-P_1+P_2+P_3$ is greater than 6.6, the binary data set "0110" is output (S134). When $-P_1+P_2+P_3$ is not greater than 6.6 in step 132, it is determined whether $-P_1+P_2+P_3$ is greater than 3.1416 (S136). The binary data set "0101" is output when $-P_1+P_2+P_3$ is greater than 3.1416 (S138), while "1010" is output as the binary data set when $-P_1+P_2+P_3$ is not greater than 3.1416 (S140).

When $A_1+A_2+A_3$ is not greater than 0.9 in step 130, the binary data set "1001"is output (S142).

When $A_0$ is not less than 5.0 in step 120, it is determined whether $A_0$ is less than 8.8 (S144). When $A_0$ is less than 8.8 in step 144, it is determined whether $A_1+A_2+A_3$ is greater than 1.9 (S146). If $A_1+A_2+A_3$ is greater than 1.9, it is further determined whether $-P_1+P_2+P_3$ is greater than 6.3 (S148). The binary data set "0111" is output when $A_1+A_2+A_3$ is greater than 1.9 and $-P_1+P_2+P_3$ is greater than 6.3 (S150), while "1110" is output as the binary data set when $A_1+A_2+A_3$ is greater than 2.5 but $-P_1+P_2P_3$ is not greater than 6.3 (S152).

When $A_1+A_2+A_3$ is not greater than 1.9 in step 146, it is determined whether $P_1+P_2-P_3$ is greater than 3.1416 (S154). When $P_1+P_2-P_3$ is greater than 3.1416, the binary data set "0110" is output (S156), while "1101" is output as the binary data set when $P_1+P_2-P_3$ is not greater than 3.1416 (S158).

When $A_0$ is not less than 8.8 in step 144, the binary data set "1111" is output (S160).

The bit pattern determined by the detector 78 is RLL coded data and includes redundant bits for error correction and disk format. Thus. The bit pattern is converted into a serial bit pattern by a parallel-to-serial converter (not shown) and RLL decoded by a decoder (not shown) to be retrieved to the desired information.

Figure 7:
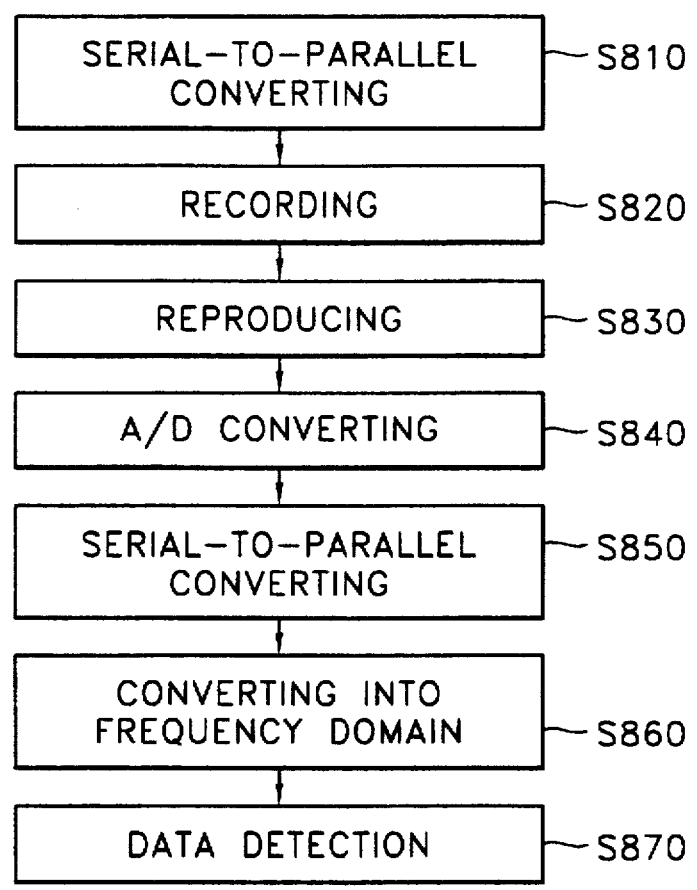
FIG. 7 is a flowchart of a digital data recording/reproducing method of the present invention.

FIG. 7 is a flowchart illustrating a digital data recording/reproducing method of the present invention.

A digital data recording/reproducing method of the present invention comprises a step (810) of performing a serial-to-parallel converting operation, steps (820 and 830) of recording and reproducing, a step (840) of performing an analog-to-digital converting operation, a step (850) of performing a serial-to-parallel converting operation, a step (860) of converting into a frequency domain, and a step (870) of detecting the data.

First, serial binary data to be recorded is input and converted into a parallel binary data set. Subsequently, to the parallel binary data set is modulated, and a recording control signal set corresponding to the modulated data set is generated to record the modulated binary data set in storage.

Afterwards, an analog signal read from the storage is gain-controlled, filtered, and converted into a digital signal. The digital signal is serial-to-parallel converted into a block of digital signals and the block of digital signals is transformed to frequency domain to generate a frequency domain signals. Finally, the most likely bit pattern are determined from the block of frequency domain signals.

In the other embodiments of the present invention, a precompensator may be included in the recorder in order to change the signal waveforms of the parallel binary data set so that the orthogonality between each of the parallel binary data sets is enhanced and the block of reproduced digital data is detected distinctly.

As described above, the present invention adopts a detection method utilizing frequency domain characteristics instead of time domain characteristics as in a conventional detection method such as peak detector, PRML, and DFE. The present invention performs recording/reproducing bit by bit. However, the modulated binary pulse of a bit which is reproduced is determined based on a parallel binary data set to which the bit belongs. In addition, detection is performed in a frequency domain block-wise using a block of digital signals of which frequency components are precompensated so as to maximize the minimum distance in a frequency domain (e.g., Euclidian norm) among blocks. Thus, a non-linear distortion which causes a lot of technical problems in a conventional detection method does not create any problem. In the present invention, a nonlinear distortion could be introduced if it is necessary to maximize the minimum distance among blocks. Thus, it is not necessary to worry about such technical problems in conventional methods as an increase of nonlinear distortion due to a high recording density, an increase of surplus bit rate (e.g., due to RLL code) for removing the increased nonlinear distortion, and an increased hardware complexity due to bit-wise detection or sequence detection (e.g., Viterbi decoder). Hence an additional circuitry for removing the nonlinear distortion or redundant bits to keep the read channel as linear as possible are not needed, thereby the invention simplifies the circuitry, can operate at a lower clock rate for the same user density, and possibly improves the density recording density.

Meanwhile, the previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. An apparatus for recording and reproducing digital data using frequency domain conversion and detection, the apparatus comprising:

a first serial-to-parallel converter for converting bits of serial binary data into a parallel binary data set;

a recording control signal generator for modulating the parallel binary data set to produce a modulated binary data set and generating a recording control signal set to record the modulated binary data set;

means for storing the modulated binary data set as stored data in response to the recording control signal set;

means for reading out the stored data as a read-out signal;

an analog-to-digital converter for converting the read-out signal from the means for storing into digital data;

a second serial-to-parallel converter for converting the digital data into a block of time domain digital data, the block including a plurality of data bits;

a frequency domain converter for converting the block of time domain digital data into a block of frequency domain signals; and a detector for detecting bits of serial binary data from the block of frequency domain signals.

2. The apparatus according to claim 1, wherein the stored data includes:

bit synchronization information;

block synchronization information;

a plurality of data blocks; and a block error check code.

3. The apparatus according to claim 2, wherein each of the plurality of data blocks comprises data bits and transition bits.

4. The apparatus according to claim 2, comprising a control signal generator for detecting the bit and block synchronization information and producing control signals, wherein the second serial-to-parallel converter, the frequency domain converter and the detector process the digital data from the analog-to-digital converter using the control signals.

5. The apparatus according to claim 2, comprising a synchronization signal generator for detecting the bit synchronization information, recovering a sampling clock, and generating a synchronization signal, wherein the analog-to-digital converter converts the read-out signal into digital data using the sampling clock recovered by the synchronization signal generator.

6. The apparatus according to claim 1, comprising:

a variable gain amplifier having an output; and a filter coupled to the output the variable gain amplifier, the filter and the variable gain amplifier being disposed between the means for storing and the analog-to-digital converter for amplifying and filtering the read-out signal.

7. The apparatus according to claim 6, comprising an automatic gain controller for detecting an amplitude fluctuation and producing an output signal, wherein the gain of the variable gain amplifier is controlled in response to the output signal of the automatic gain controller.

8. The apparatus according to claim 1, wherein the detector comprises calculating means for calculating Euclidian norms between the block of frequency domain signals and a plurality of reference data blocks, respectively, and determining a binary data set which corresponds to the minimum value of the Euclidian norms.

9. The apparatus according to claim 8, wherein each of the plurality of reference data blocks are frequency domain signal values of a parallel binary data set, respectively.

10. The apparatus according to claim 8, wherein the reference data blocks are defined experimentally by recording a plurality of parallel binary data sets, reproducing recorded time domain signals in the frequency domain and storing reproduced signals in a memory.

11. The apparatus according to claim 1, wherein the detector comprises comparing means for sequentially comparing the block of frequency domain signals with a plurality of thresholds to determine the bits of serial binary data.

12. The apparatus according to claim 11, wherein the plurality of thresholds are defined based on frequency domain signal values of a plurality of parallel binary data sets, respectively.

13. The apparatus according to claim 11, wherein the plurality of thresholds are defined experimentally by recording a plurality of parallel binary data sets, reproducing recorded time domain signals in the frequency domain and grouping reproduced signals according to size.

14. The apparatus according to claim 1, comprising a frequency domain precompensator coupled to the first serial-to-parallel converter for changing a signal waveform of the parallel binary data set so that orthogonality between parallel binary data sets is enhanced and a block of reproduced digital data is detected distinctly.

15. A method for recording and reproducing digital data using frequency domain conversion and detection, the method comprising:

(a) converting bits of serial binary data into a parallel binary data set;

(b) generating a recording control signal set to store the parallel binary data set as stored data;

(c) reading out the stored data as reproduced data;

(d) converting the reproduced data into a serial digital signal;

(e) converting the serial digital signal into a block of parallel time domain digital signals;

(f) converting the block of parallel time domain digital signals into a block of frequency domain signals; and (g) detecting serial binary data from the block of frequency domain signals.

16. The method according to claim 15, wherein detecting serial binary data comprises:

calculating Euclidian norms between the block of frequency domain signals and a plurality of reference data blocks, respectively;

selecting a minimum value of the Euclidian norms; and determining a binary data set which corresponds to the minimum value of the Euclidian norms.

17. The method according to claim 16 comprising determining the plurality of reference data blocks including converting a plurality of parallel binary time data sets into the frequency domain.

18. The method according to claim 16 comprising determining the plurality of reference data blocks experimentally by recording a plurality of parallel binary time domain data sets and converting the recorded signals into the frequency domain.

19. The method according to claim 15 wherein detecting serial binary data comprises sequentially comparing the block of frequency domain signals to a plurality of thresholds.

20. The method according to claim 19 comprising determining the plurality of thresholds based on frequency domain signal values of the plurality of a parallel binary data sets.

21. The method according to claim 19 comprising determining the plurality of thresholds experimentally including:

recording a plurality of parallel binary time domain data sets;

reproducing the recorded signals in the frequency domain; and grouping the reproduced signals according to size.

22. The method according to claim 15 comprising, after converting the serial digital signal into a block of parallel time domain digital signals, frequency domain precompensating the parallel binary data set for changing a signal waveform of the parallel binary data set so that orthogonality between parallel binary data sets is enhanced and a block of reproduced digital data is detected distinctly.

23. An apparatus recording and reproducing digital data in at least one of a magneto-optical and a magnetic recording system, the apparatus comprising:

a recording control signal generator for generating a recording control signal set on at least one of a magneto-optical and a magnetic recording system;

a frequency domain converter for receiving sampled data from at least one of the magneto-optical and the magnetic recording system as a block of time domain digital signals for performing a transform on the block of time domain digital signals to convert the block of time domain digital signals into a block of frequency domain digital signals, and outputting the block of frequency domain digital signals; and a detector for receiving the block of frequency domain digital signals, for determining a bit pattern from at least one of frequency distribution, size, and phase of the block of frequency domain digital signals, and for outputting the bit pattern.

24. The apparatus according to claim 23 comprising a frequency domain precompensator for receiving a plurality of parallel digital data bits, for precompensating the plurality of parallel digital data bits to change a signal waveform of the plurality of parallel data bits so that orthogonality between each of the plurality of parallel digital data bits is enhanced and a block of reproduced digital data is detected distinctly.

* * * * *

UNITED STATES PATENT AND TRADEMARK OFFICE
CERTIFICATE OF CORRECTION

PATENT NO.   : 5,768,246
DATED        : June 16, 1998
INVENTOR(S)  : Kim

It is certified that error appears in the above-indentified patent and that said Letters Patent is hereby corrected as shown below:

Column 8, Line 55, after " the output" insert --of--;

Column 10, Line 1, after "time" insert --domain--.

Signed and Sealed this

Sixth Day of October, 1998

Attest:

BRUCE LEHMAN

*Attesting Officer*   Commissioner of Patents and Trademarks